United States Patent [19]

Flowers et al.

[11] Patent Number: 5,744,416
[45] Date of Patent: Apr. 28, 1998

[54] CATALYST SYSTEM FOR POLYCARBONATE MANUFACTURE

[75] Inventors: Larry I. Flowers; Paul D. Sybert, both of Evansville; David L. Ramsey, Mt. Vernon, all of Ind.

[73] Assignee: General Electric Company, Pittsfield, Mass.

[21] Appl. No.: 597,420

[22] Filed: Feb. 8, 1996

Related U.S. Application Data

[62] Division of Ser. No. 241,306, May 10, 1994, Pat. No. 5,510,449.
[51] Int. Cl.$^6$ ............................................. B01J 31/00
[52] U.S. Cl. .................. 502/152; 502/150; 502/162; 502/164
[58] Field of Search ........................ 502/150, 152, 502/162, 164

[56] References Cited

U.S. PATENT DOCUMENTS

| | | |
|---|---|---|
| 3,635,895 | 1/1972 | Kramer . |
| 4,001,184 | 1/1977 | Scott . |
| 4,156,069 | 5/1979 | Prevorsek et al. . |
| 4,465,820 | 8/1984 | Miller et al. . |
| 4,471,105 | 9/1984 | Campbell et al. . |
| 4,506,065 | 3/1985 | Miller et al. . |
| 4,701,544 | 10/1987 | Silva . |
| 4,814,420 | 3/1989 | Brunell et al. . |
| 4,927,904 | 5/1990 | Guggenheim et al. . |
| 5,006,637 | 4/1991 | Guggenheim et al. . |
| 5,300,624 | 4/1994 | Boder et al. .............................. 528/199 |

*Primary Examiner*—Elizabeth D. Wood

[57] ABSTRACT

A method is provided for making polycarbonates utilizing an effective amount of a binary phase transfer catalyst, such as tetrabutylammonium bromide and a methyl tertiary amine as a condensation catalyst during the interfacial phosgenation of a bisphenol, such as bisphenol A. Improved phosgene utilization is achieved.

11 Claims, No Drawings

CATALYST SYSTEM FOR POLYCARBONATE MANUFACTURE

This is a divisional of application Ser. No. 08/241,306 filed on May 10, 1994 now U.S. Pat. No. 5,510,449.

BACKGROUND OF THE INVENTION

The present invention relates to a method for making polycarbonates by phosgenating a bisphenol in the presence of a phase transfer catalyst (PTC). More particularly, the present invention relates to the employment of a PTC, such as a tetra-alkylammonium or tetraalkyl phosphonium halide in combination with a methyl tertiary amine as a condensation catalyst for the polymerization of a bisphenol under interfacial reaction conditions.

As shown by Freitag et al, The Encyclopedia of Polymer Science and Engineering, John Wiley & sons, New York (1988), Second Edition, polycarbonates have been made by phosgenating bisphenols under interfacial reaction conditions using a tertiary organic amine, such as triethylamine as a condensation catalyst. Although tertiary organic amines have been found to be effective as bisphenol condensation catalysts, experience has shown that use of tertiary organic amines results in excess phosgene usage. Efforts have been made therefore to develop procedures to minimize excessive phosgene losses. For example, a reactor with an overhead condenser can be used to trap phosgene, as shown by Silva, U.S. Pat. No. 4,701,544, or the rate of heat generated during the course of bisphenol condensation can be monitored, as shown by Brunelle et al, U.S. Pat. No. 4,814,420.

Although tertiary organic amines have been found to be highly effective as condensation catalysts for building polycarbonate molecular weight during phosgenation, experience has shown that tertiary organic amines often lead to excessive phosgene usage as a result of phosgene hydrolysis, and/or chloroformate hydrolysis prior to the termination of polymerization. For example, in a phosgene hydrolysis rate study, it was found that at a triethylamine concentration of $6.64 \times 10^{-3}$M, triethylamine catalyst effected phosgene hydrolysis at a relative rate of greater than 200 compared to a reference value of 1 without any catalyst. With respect to the rate of chloroformate hydrolysis, where a relative value of less than 0.01 has been found for a catalyst-free system, triethylamine shows a value of greater than 100, and N-methylpiperidine greater than 1000.

In Campbell et al, U.S. Pat. No. 4,471,105, an interfacial polycarbonate poly condensation process is shown for making polycarbonates from sterically hindered bisphenol precursors utilizing a quaternary phosphonium amino halide catalyst. Additional investigations with respect to phase transfer catalyst usage demonstrate the syntheses of copoly (carbonate-thiocarbonate)s from bisphenols and a mixture of phosgene and thiophosgene are shown by Tagle et al, European Polymer Journal 1987, 23(2), 109–112, and European Polymer Journal 1989,26(6), 549–551.

Various condensation catalysts are constantly being evaluated to determine their effectiveness for polymerizing various types of polymers. Considerable effort is being maintained to determine the effectiveness of such condensation catalysts as replacement condensation catalysts for tertiary organic amines in conventional polycarbonate synthesis.

SUMMARY OF THE INVENTION

The present invention is based on the discovery that a phase transfer catalyst, "PTC", selected from the class consisting of, $(R)_4N^+X$,
$R^1(R)_3Q^+X$, and
$(R^2)_a(R^3)_{3-a}N-(CH_2)_n N-(R^3)_{3-a}(R^2)_a 2X$ where R is selected from the same or different $C_{(3-10)}$ alkyl group, $R^1$ is a $C_{(1-3)}$ alkyl group, $R^2$ is selected from the same or different $C_{(1-2)}$ alkyl group, $R^3$ is selected from the same or different $C_{(3-10)}$ alkyl group, Q is a nitrogen or phosphorus atom, X can be a halogen atom, or an $-OR^4$ group, $R^4$ is a member selected from H, $C_{(1-18)}$ alkyl or $C_{(6-18)}$ aryl, n is a whole number from 4 to 6 and "a" is a whole number equal to 0 to 1, comprising a small amount of a methyl tertiary amine ranging from about 0.001 to about 0.200 mole % based on the quantity of bisphenol-A has been found to be effective as a bisphenol condensation catalyst under interfacial reaction conditions between bisphenols, or oligomeric phenols, and chloroformate terminated bisphenols, or chloroformate terminated polycarbonate oligomers. As a result, the PTC's of the present invention can be used to make aromatic polycarbonates and polycarbonate copolymers, such as shown in U.S. Pat. Nos. 3,635,895 and 4,001,184, herein incorporated by reference. These aromatic polycarbonates which can be made using the phase transfer catalyst of the present invention include high molecular weight thermoplastic randomly branched materials. Some of the polyfunctional compounds which can be employed in making the branched polymers are generally aromatic and contain at least three functional groups, such as phenoxy, carboxyl, carboxylic anhydride, haloformyl or mixtures there of. Additional polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid and benzophenonetetracarboxylic anhydride. The preferred polyfunctional aromatic compounds useful in making high molecular weight thermoplastic randomly branched polycarbonates are 1,1,1-tris-(4-hydroxyphenyl)-ethane, 4-[4-[1, 1-bis(4-hydroxyphenyl)-ethyl]-dimethylbennzyl] phenol, 1,1,1-tris (4-hydroxphenyl)ethane, trimellitic anhydride or trimellitic acid or their haloformyl derivatives.

An example for copolymer formation is the preparation of copolyester carbonates from dicarboxylic acids. These copolymer compositions are set forth in U.S. Pat. Nos. 4,506,065, 4,465,820, and 4,156,069, herewith incorporated by reference. Although any aromatic dicarboxylic acid can be used, the preferred dicarboxylic acids are terephthalic acids and isophthalic acids and mixtures thereof. Alternatively, derivatives of such acids, such as the acid halides, for example the acid dichlorides and acid dibromides for such aromatic dicarboxylic acids, for example, terephthaloyl dichloride, mixtures with isophthaloyl dichloride can also be used. High flow ductile copolyester carbonates using aliphatic dicarboxylic acids also can be prepared. The preferred aliphatic dicarboxylic acids are azelaic acid, suberic acid, 1,10-decanedicarboxylic acid and 1,12-dodecanedicarboxylic acid. In addition, polycarbonate-siloxane block copolymers also can be made by utilizing the phase transfer catalyst of the present invention in the reaction between a bisphenol and a phenolic terminated polydiorgano siloxane, such as a eugenol terminated polydimethylsiloxane.

In addition, it has been found that the relative rate of phosgene hydrolysis, or chloroformate hydrolysis for the PTC of formulas (1), (2) or (3) at a molar concentration of $6.64 \times 10^{-3}$, is considerably less than triethylamine or methyl tertiary amine. For example, as compared to values greater than 200 and 100 respectively for triethylamine as a phosgene or chloroformate hydrolysis catalyst at molar concentrations of $6.64 \times 10^{-3}$, a phase transfer catalyst within formula (1) or (2) have been found to have relative rate values of 1.7 to 3.5 for phosgene and about 1 for chloroformate. Although methyl tertiary amines have been demonstrated to hydrolyze phosgene and chloroformates, the combination of a small amount of one or more methyl tertiary amines and a phase transfer catalyst has given unexpected and surprising results as herein described. By keeping the concentration of the methyl tertiary amine catalyst component in a range varying from about 0.001 to about 0.200 mole % based on the quantity of bisphenol, the utilization of phosgene can be made much more efficient, reducing the amount of excess phosgene necessary to insure complete reaction of the bisphenol from about a 15% excess, based on theoretical, to about a 5% excess, sometimes even lower.

DETAILED DESCRIPTION

There is provided by the present invention, a method for making polycarbonate, comprising, (a) effecting reaction under interfacial reaction conditions at a pH in the range of 7 to 12.5 between a phenolic chain-stopper and a bisphenol of the formula,

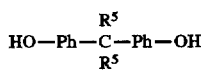

where $R^5$ is selected from the same or different $C_{(1-4)}$ alkyl group, and a substantially stoichiometric amount of phosgene in the presence of an amount of phase transfer catalyst comprising the formulas (1), (2) or (3) and a methyl tertiary amine and which is effective for providing polycarbonate having a GPC molecular weight in the range of about 10K to about 180k compared, and (B) substantially eliminating chloroformate end groups in the resulting mixture of (A) prior to polycarbonate recovery.

Some of the bisphenols which are included within the formula (4) are, for example, 2,2-bis(4-hydroxy phenyl)propane (bisphenol A)
2,2-bis(4-hydroxy phenyl)butane (bisphenol B)
4,4-bis(hydroxy phenyl)heptane
2,2-bis(hydroxy phenyl)hexane
2,2-bis(4-hydroxy phenyl)pentane
2,2-bis(4-hydroxy phenyl)-4-methyl pentane
2,2-bis(4-hydroxy phenyl)heptane, and
3,3-bis(4-hydroxy phenyl)2,4-dimethyl pentane.

Some of the phase transfer catalysts which are included within formula (1) are for example,

[CH$_3$(CH2)$_3$]$_4$NX
[CH$_3$(CH$_2$)$_5$]$_4$NX
[CH$_3$(CH2)$_6$]$_4$NX, and
CH$_3$[CH$_3$(CH$_2$)$_3$]$_3$NX where X is selected from Cl-, Br or —OR$^4$ where R$^4$ is as previously defined.

In addition to the phase transfer catalysts of formula (1), there are included within formulas (2) and (3), phase transfer catalysts having the formulas,

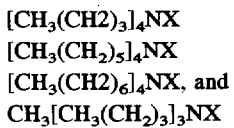

CH$_3$(C$_4$H9)$_3$NX,
CH$_3$(C$_4$H9)$_3$PX
C$_2$H$_5$(C$_6$H$_{13}$)$_3$NX,
(C$_4$H$_9$)$_3$N—(CH$_2$)$_6$—N(C$_4$H9)$_3$2X,
(C$_3$H$_7$)$_3$N—(CH$_2$)$_6$—N(C$_3$H$_7$)$_3$2X, and

CH$_3$(C$_5$H$_{11}$)$_2$N—(CH$_2$)$_4$—N(C$_5$H$_{11}$)$_2$CH$_3$2X, where X is as previously defined.

By the phrase methyl tertiary amine applicant defines the following compounds:

CH$_3$R$_1$R$_2$N where $R_1$ and $R_2$ may be identical or different and are hydrocarbyl. Additionally $R_1$ and $R_2$ may be the same such as in alicyclic compounds, thus a methyl tertiary amine is intended to encompass compounds such as N-methylpiperidine which is one example.

In the practice of one form of the present invention, a mixture of bisphenol and a phenolic chain-stopper is phosgenated under interfacial reaction conditions in the presence of an organic solvent, in the presence of an effective amount of a phase transfer catalyst included within formula (1), (2) or (3) and also containing N-methylpiperidine. Suitable organic solvents which can be used are, for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

An effective amount of phase transfer catalyst is from 0.05 to 10.00 mole % based on the moles of bisphenol charged to the mixture. A preferred range of the phase transfer catalyst ranges from about 0.1 to about 0.7 mole % based on the total moles of bisphenol. The quantity of methyl tertiary amine co-catalyst ranges from about 0.001 to about 0.2 mole % based on the moles of bisphenol, a more preferred range is from about 0.003 to about 0.02 mole % based on the amount of bisphenol charged to the mixture.

Sufficient alkali metal hydroxide can be utilized to raise the pH of the bisphenol reaction mixture to 10.5 prior to phosgenation to provide dissolution of some of the bisphenol and chain-stopper into the aqueous phase.

Aqueous alkali, or alkaline earth metal hydroxide can be used to maintain the pH of the phosgenation mixture which can be in the range of between about 7 to about 12.5 and preferably 10 to 12. Some of the alkali metal or alkaline earth metal hydroxides, which can be employed are for example, sodium hydroxide, potassium hydroxide, and calcium hydroxide. Sodium and potassium hydroxides and particularly sodium hydroxide is preferred.

Phosgenation of the bisphenol can be conducted in a wide variety of either batch or continuous reactors, Such reactors are, for example, stirred tank reactors, which may be either batch or continuous flow. Additional reactors which are included are agitated column and recirculating loop continuous reactors.

The volume ratio of aqueous to organic phase during and at the termination of the phosgenation reaction can be in the range of 0.2–1.1. Reaction temperature can be in the range of between about 15°–50° C. When the preferred organic liquid is utilized, such as methylene chloride, the reaction may be conducted at reflux which can be 35°–42° C. The reaction can be conducted at atmospheric pressures, although sub- or superatmospheric pressures may be employed if desired.

During phosgenation, the mixture is agitated, such as, by using a stirrer or other conventional equipment. The phosgenation rate can vary from between about 0.02–0.2 mole of phosgene, per mol of bisphenol per minute.

Depending upon the molecular weight of polycarbonate desired, phenolic chain-stoppers can be used in a proportion of from 1 to 8 mole % based on the total moles of bisphenol and phenolic chain-stopper. Some of the phenolic chain-stoppers are, phenol, t-butyl phenol, p-cumylphenol and the chloroformates of these phenols.

Prior to polycarbonate recovery which can be achieved by standard techniques, such as filtration, decantation, and centrifugation, chloroformate groups are normally substantially eliminated. When a phase transfer catalyst is used by itself, the reaction mixture must be agitated for long periods of time until the presence of chloroformate groups can no longer be detected. Alternatively, the addition of an equivalent level of a phenolic compound based on the level of chloroformate can be added at the end of the reaction.

In the present invention, a binary catalyst system comprising a phase transfer catalyst and one or more methyl tertiary amines, the chloroformates react after only a few minutes, leading to a kinetically improved process. A very small amount of the methyl tertiary amine serves to catalyze the disappearance of the chloroformate as compared to other tertiary amines such as triethylamine. The reaction mixture containing chloroformates is agitated until the presence of chloroformates can not be detected. A detection procedure based on Agree et al. can be used employing 4-(4-nitrobenzyl)pyridine (NBP) as shown in Talanta, volume 13, pp 1151–1160 published inn 1966. Spot testing using commercially available phosgene detection paper such as Chemcassette SP from MDA Scientific of Lincolnshire, Ill. using a portion of the reaction mixture can also be employed.

In order that those skilled in the art will be better able to practice the present invention, The following examples are given by way of illustration and not by way of limitation. All parts are by weight unless otherwise indicated.

EXAMPLES

Example 1

A 2 liter flask equipped with a stirrer, pH electrode, NaOH addition port and a phosgene dip tube was charged with 57 gm (0.25 mole) of bisphenol-A, 1.9 para-cumylphenol, 450 ml methylene chloride, 250 ml water and 0.01 gm N-methylpiperidine (0.04 mole % to moles of bisphenol-A). Phosgene was introduced at a rate of approximately 1 g/min. A solution of 25% NaOH was added slowly to maintain a pH of 10.5 during the phosgene addition. The phosgene addition was stopped after adding approximately 15% excess phosgene over stoichiometric. The aqueous phase was analyzed for sodium carbonate, finding 39 g/Kg, demonstrating that approximately 40% of the phosgene was hydrolyzed. Molecular weight determination on the resultant organic product showed a weight average molecular weight of only about 2,000 indicating no significant polymer formation.

Example 2

A 2 liter flask equipped with a stirrer, pH electrode, NaOH addition port and a phosgene dip tube was charged with 57 gm (0.25 mole) of bisphenol-A, 1.9 para-cumylphenol, 450 ml methylene chloride, 250 ml water and 0.42 gm tetrabutylammonium bromide (0.70 mole % to moles of bisphenol-A). Phosgene was introduced at a rate of approximately 1 g/min. A solution of 25% NaOH was added slowly to maintain a pH of 10.5 during the phosgene addition. The phosgene addition was stopped when chloroformates were detected by test paper (Chemcassette SP from MDA Scientific, Lincolnshire, Ill.) The reaction was stirred at pH 10.5 and the reaction solution was periodically tested for the presence of chloroformates. After one hour chloroformates were still present.

Example 3

The experimental apparatus used in example 1 was charged with 57 g (0.25 moles) of bisphenol-A, 1.9 g para-cumylphenol, 450 ml methylene chloride, 250 ml water, 0.42 g tetrabutylammonium bromide (0.7 mole % to moles of bisphenol-A) and 0.065 g triethylamine (0.25 mole % to moles of bisphenol-A). Phosgene was introduced at a rate of approximately 1 g/min. A solution of 25% NaOH was added slowly to maintain a pH of 10.5 during the phosgene addition. The phosgene addition was stopped when chloroformates were detected by test paper (Chemcassette SP from MDA Scientific, Lincolnshire, Ill.). The reaction was stirred at pH 10.5 and the reaction solution was periodically tested for chloroformates which disappeared within 10 minutes. The organic phase was washed with 1.0N HCl followed by at least three washings with water. The weight average molecular weight of the resulting polymer was approximately 26,000.

Example 4

The experiment in example 2 was repeated with 0.001 gm N-methylpiperidine (0.004 mole % to moles of bisphenol-A). After phosgenation the resulting chloroformates disappeared within ten minutes. The weight average molecular weight of the resulting polymer was approximately 26,000.

Example 5

The experiment in Example 4 was repeated with 0.01 g N-methylpiperidine. After phosgenation the resulting chloroformates disappeared within ten minutes. The weight average molecular weight of the resulting polymer was approximately 26,000.

Example 6

The experiment in Example 3 was repeated with 0.005 g diethylmethylamine (0.025 mole % to moles of bisphenol-A). After phosgenation the resulting chloroformates disappeared within 30 minutes. The weight average molecular weight of the resulting polymer was approximately 25,000.

Example 7

A 30 liter flask equipped with a stirrer, condenser, pH electrode, NaOH addition port and a phosgene dip tube was charged with 2,268 g of bisphenol-A, 84.44 g para-cumylphenol, 3.4 g sodium gluconate, 5.85 g methyltributylammonnium chloride, 0.1 g N-methylpiperidine, 4.0 liters water, and 7 liters methylene chloride. Phosgene was introduced at a rate of approximately 40 g/min. A solution of 50 wt. % NaOH was added slowly to maintain a pH of about 10.5 during the phosgene addition. The phosgene addition was stopped when chloroformates were detected by test paper (Chemcassette SP from MDA Scientific, Licoln, Ill.). The reaction was stirred at pH 10.5 and the reaction solution was periodically tested for the presence of chloroformates. After a period of 2–4 minutes the chloroformates had disappeared. Molecular weight measurement showed the reaction to be complete using an excess of phosgene of approximately only 5 %.

SUMMARY OF EXPERIMENTAL RESULTS

Comparative example 1 demonstrates the large amount of phosgene hydrolysis when using N-methylpiperidine alone as a catalyst. Comparative example 2 demonstrates the persistence of chloroformates at the end of phosgenation when using a phase transfer catalyst alone. Comparative example 3 demonstrates the use of triethylamine (0.25 mole % to moles of bisphenol-A) with a phase transfer catalyst wherein the chloroformates disappear after about 10 minutes.

Examples 4 and 5 demonstrate the use of N-methylpiperidine in place of the triethylamine used in example 3. The use of from 0.004 to 0.1 mole % N-methylpiperidine is as effective as 0.25 mole % triethylamine in comparative example 3, i.e. N-methylpiperidine is approximately 60 times more active than triethylamine.

What is claimed is:

1. A catalyst composition to catalyze the interfacial condensation reaction to produce polycarbonates, polyesters, copolymers, or mixtures thereof, said catalyst composition comprising a first catalyst selected from the group consisting of:

$(R)_4N^+X$ $R^1(R)_3Q^+X$ and $(R^2)_a(R^3)_{3-a}N-(CH_2)_nN-(R^3)_{3-a}(R^2)_a 2X$ where R is selected from the same or different $C_{(4-10)}$ alkyl group, $R^1$ is a $C_{(1-3)}$ alkyl group, $R^2$ is selected from the same or different $C_{(1-2)}$ alkyl group, $R^3$ is selected from the same or different $C_{(3-10)}$ alkyl group, Q is a nitrogen or phosphorus atom, X is a halogen atom, or an $-OR^4$ group, $R^4$ is a member selected from H, $C_{(1-18)}$ alkyl or $C_{(6-18)}$ aryl, "n" is a whole number from 4 to 6 and "a" is a whole number equal to 0 or 1; and from 0.006 to 0.14 moles of a second catalyst which is a methyl tertiary amine per mole of the first catalyst.

2. The catalyst composition of claim 1 wherein said first catalyst is $(R)_4N^+X$ and where R is selected from the same or different $C_{(4-10)}$ alkyl group.

3. The catalyst composition of claim 1 wherein said first catalyst is $R^1(R)_3Q^+X$ and where R is selected from the same or different $C_{(4-10)}$ alkyl group, $R^1$ is a $C_{(1-3)}$ alkyl group, $R^2$ is selected from the same or different $C_{(1-2)}$ alkyl group, $R^3$ is selected from the same or different $C_{(3-10)}$ alkyl group, and Q is a nitrogen or phosphorus atom.

4. The catalyst composition of claim 1 wherein said first catalyst is $(R^2)_a(R^3)_{3-a}N-(CH_2)_nN-(R^3)_{3-a}(R^2)_a 2X$, and where R is selected from the same or different $C_{(4-10)}$ alkyl group, $R^1$ is a $C_{(1-3)}$ alkyl group, $R^2$ is selected from the same or different $C_{(1-2)}$ alkyl group, $R^3$ is selected from the same or different $C_{(3-10)}$ alkyl group, Q is a nitrogen or phosphorus atom, X can be a halogen atom, or an $-OR^4$ group, $R^4$ is a member selected from H, $C_{(1-18)}$ alkyl or $C_{(6-18)}$ aryl, and "a" is a whole number equal to 0 or 1.

5. The catalyst composition of claim 1 wherein the methyl tertiary amine second catalyst is present in an amount ranging from about 0.006 to about 0.06 mole percent of the first catalyst.

6. The catalyst composition of claim 5 wherein said first catalyst is $(R)_4N^+X$ and where R is selected from the same or different $C_{(4-10)}$ alkyl group.

7. The catalyst composition of claim 5 wherein said first catalyst is $R^1(R)_3Q^+X$ and where R is selected from the same or different $C_{(4-10)}$ alkyl group, $R^1$ is a $C_{(1-3)}$ alkyl group, $R^2$ is selected from the same or different $C_{(1-2)}$ alkyl group, $R^3$ is selected from the same or different $C_{(3-10)}$ alkyl group, and Q is a nitrogen or phosphorus atom.

8. The catalyst composition of claim 5 wherein said first catalyst is $(R^2)_a(R^3)_{3-a}N-(CH_2)_nN-(R^3)_{3-a}(R^2)_a 2X$, and where R is selected from the same or different $C_{(4-10)}$ alkyl group, $R^1$ is a $C_{(1-3)}$ alkyl group, $R^2$ is selected from the same or different $C_{(1-2)}$ alkyl group, $R^3$ is selected from the same or different $C_{(3-10)}$ alkyl group, Q is a nitrogen or phosphorus atom, X can be a halogen atom, or an $-OR^4$ group, $R^4$ is a member selected from H, $C_{(1-18)}$ alkyl or $C_{(6-18)}$ aryl, and "a" is a whole number equal to 0 or 1.

9. The composition of claim 1 wherein the second catalyst has the formula $CH_3R_1R_2N$ wherein $R_1$ and $R_2$ are the same or different hydrocarbyls or $R_1$ and $R_2$ taken together form an acrylic ring with the nitrogen.

10. The composition of claim 1 wherein the second catalyst is N-methylpiperidine.

11. The composition of claim 1 wherein the second catalyst is diethylmethyl amine.

* * * * *